June 26, 1934.   J. FOTAKIS   1,964,626
COMBINATION REAR VIEW MIRROR SET FOR AUTOMOBILES
Filed July 5, 1932
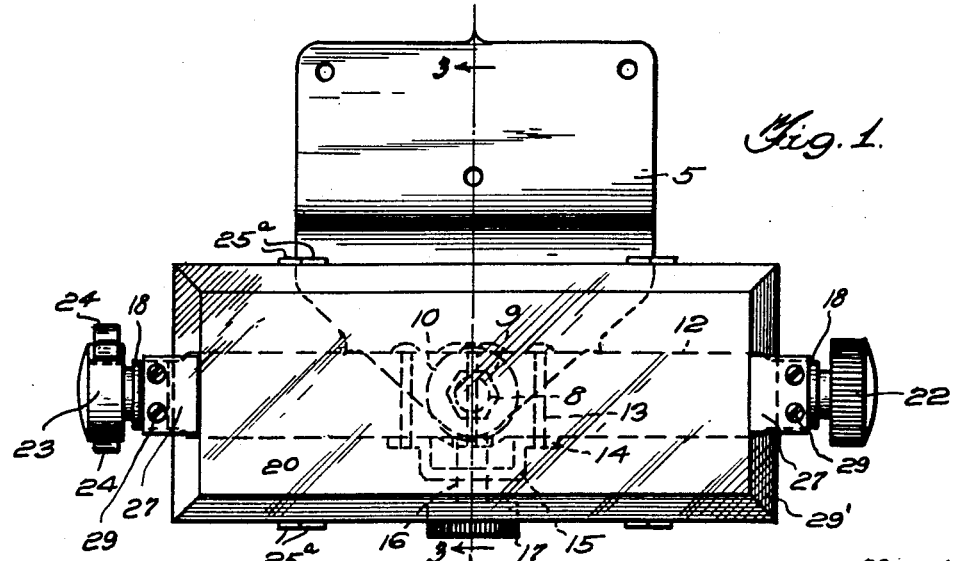
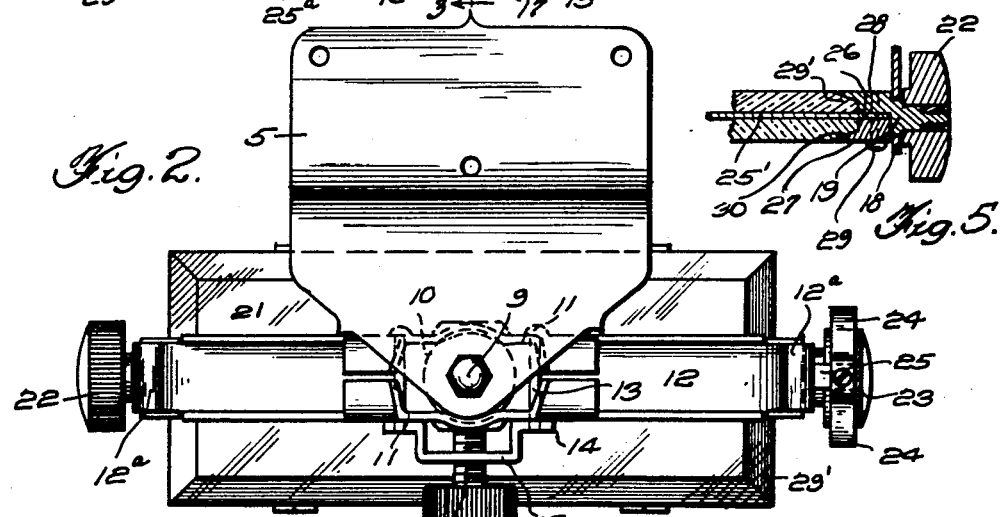
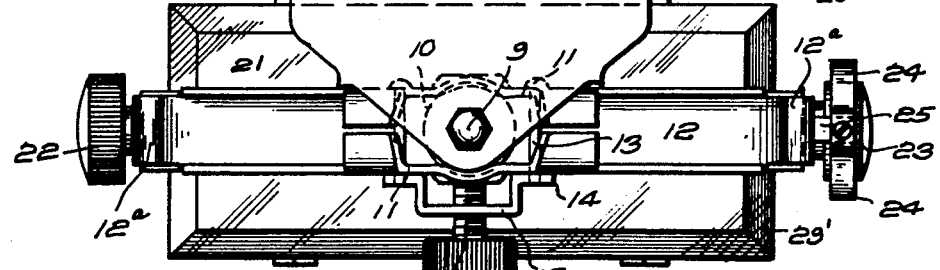
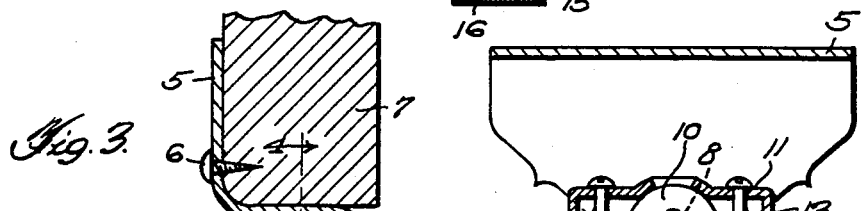
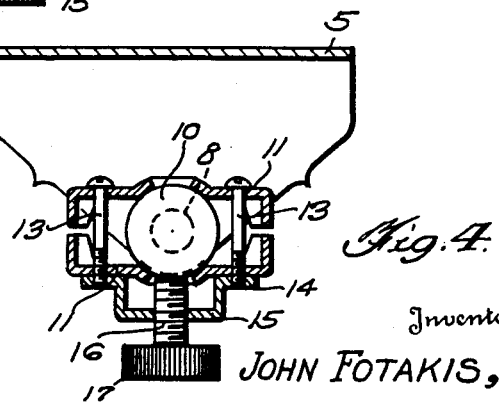
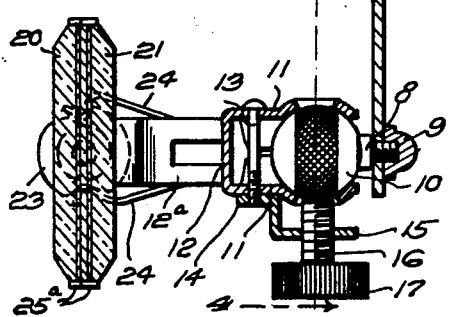
Inventor
JOHN FOTAKIS,
By Shepherd Campbell
Attorneys Patented June 26, 1934

1,964,626

UNITED STATES PATENT OFFICE 1,964,626

COMBINATION REAR VIEW MIRROR SET FOR AUTOMOBILES

John Fotakis, Washington, D. C.

Application July 5, 1932, Serial No. 620,944

4 Claims. (Cl. 45—97)

This invention relates to a combination rear view mirror set for automobiles of the character of that shown in my Patent No. 1,864,015, dated June 21, 1932, and it has for its object to provide an improved device of this general character of simple and economical construction, one which may be easily adjusted to any desired angle in both vertical and horizontal planes and can not be jolted or jarred out of said adjustment under the movement of the vehicle to which it is applied; these adjustments being common to both "light" and "dark" mirrors for night and day driving.

The rear view mirrors first employed on automobiles comprised mirrors of ordinary construction, i. e., those having highly reflective backings. While such mirrors were very efficient in daylight driving, they were objectionable for night driving, because they reflected into the eyes of the driver, with full force, the rays from the headlights of following automobiles. To cure the foregoing defect, rear view mirrors have recently been proposed, and are now largely used, having backings of a dark or black material. These latter mirrors are found to very materially cut down the glare from the headlights of following automobiles, while they still yield a fair service as reflecting mediums, in daylight. Therefore, like my patent aforesaid, the structure of the present invention employs the two mirrors; one having a highly reflective backing and the other having a dark backing; the two being mounted to be reversible to bring either of them into action and the mounting being adjustable in both the vertical and horizontal planes through the medium of an adjusting means which is accessible for positive setting without destroying the initial adjustment of the mirror that is being used. That is to say, the mounting is shiftable against the resistance of a frictionally held element to bring it to that position of adjustment where the driver can best see the roadway behind him after which a positive binding means may be manipulated to lock the parts in such set position and against dislocation under the vibration of the moving vehicle.

Further objects and advantages will be set forth in the detailed description which follows:

In the accompanying drawing—

Figure 1 is a front elevation of a device constructed in accordance with the invention.

Figure 2 is a rear elevation.

Figure 3 is a transverse vertical section on line 3—3 of Fig. 1.

Figure 4 is a longitudinal sectional view upon line 4—4 of Fig. 3, and

Figure 5 is a detailed sectional view through one of the trunnions.

Like numerals designate corresponding parts in all the figures of the drawing.

In carrying out the invention, I provide a substantially Z-shaped bracket 5 adapted to be held in place by screws 6 upon the upper top member 7 of the automobile body and immediately inside of the upper portion of the windshield. A stem 8 is secured to the lower portion of this bracket by a nut 9 or like suitable binding member, and said stem carries a relatively large ball 10. This ball is frictionally clamped between the two rearwardly extending wings 11 of a transverse frame 12, said wings being forced toward each other by the drawing action of screws 13, said screws passing through said wings and taking into feet 14 of a plate 15.

A stout set screw 16 having a knurled head 17 is threaded through the plate 15 and passes freely through an opening formed in the lower wing 11 and bears upon the periphery of the ball 10; the periphery of said ball being knurled to adapt the end of said set screw to firmly engage the same. The outer ends of the frame 12 are forwardly turned, as indicated at 12a, and constitute bearing portions 18 for the trunnions 19, which support the light and dark mirrors 20, 21, respectively.

One of these trunnions carries a knurled circular thumb piece 22 by which the trunnion and the mirrors may be turned to bring either the light or the dark mirror before the eyes of the user. The trunnion at the opposite end of the mirrors carries a ratchet disk 23 that is engageable by spring fingers 24, said fingers being in turn supported by a tongue 25 struck from one of the end frame members 12a.

The mirrors are mounted with respect to the trunnions as follows: A metallic plate 25' is disposed between the two mirrors and is provided with reduced end extensions 26 which lie between blocks 27 and a correspondingly shaped portion 28 of the trunnion. Screws 29 bind the blocks 27 and extensions 26 and the portions 28 of the trunnions forcibly together and in so doing bind the bevelled end portions 29' of the mirrors between the bevelled extensions 30 and the plate 25 in such manner as to mount the mirrors for bodily turning movement with the trunnions; the upper and lower edges of said mirrors being engaged by tongues 25a formed upon plate 25 and bent over the bevelled upper and lower edges of the mirrors.

The pawl and ratchet construction provided by the springs 24 and ratchet disk 23 prevents turning movement of the mirrors in one direction and permits turning movement in the other direction; the spring fingers being of such tension as to snap into the notches formed in disks 23, as shown, to hold either the dark or the light mirror in adjusted position about the axis of the trunnions. With the set screw 16 released the screws 13 bring about such frictional engagement between wings 11 and the knurled ball 10 that, while the mirrors may be tipped in any direction with respect to the ball, they will remain in the position to which they are adjusted long enough for the operator to turn the set screw 16 to positively engage ball 10 and bind the parts in such adjusted position.

Consequently, a more facile and efficient adjustment of the mirrors may be effected through this construction than by the means of any other with which I am familiar.

While I have shown a Z-shaped bracket 5 as constituting the means for mounting the ball 10, it is to be understood that a bracket of any suitable shape may be employed for this purpose. The invention is not limited with respect to the particular shape of the parts employed and it is to be understood that it includes within its purview whatever changes fairly come within either the terms or the spirit of the appended claims.

Having described my invention, what I claim is:

1. The combination with a supporting bracket, a ball projecting forwardly therefrom having a knurled surface, a frame comprising a pair of wings lying above and below said ball, said wings having seats formed therein for engagement with said ball, a plate fixed to one of said wings, and a set screw threaded in said plate and engaging the knurled surface of said ball, and a pair of light and dark mirrors reversibly mounted upon said frame.

2. A structure as recited in claim 1 in combination with means for locking said mirrors in their opposite positions of adjustment upon said frame.

3. A structure as recited in claim 1 wherein the means for mounting said mirrors comprises trunnions, means carried by one of said trunnions for imparting turning movement to the same, and means carried by the other of said trunnions for locking the mirrors in their opposite positions of adjustment.

4. A structure as recited in claim 1 wherein the means for mounting said mirrors comprises trunnions journaled in forward extensions of said frame, means carried by one of said trunnions for imparting turning movement thereto, a ratchet disk carried by the other of said trunnions, a member struck from said frame, and spring fingers carried by said member and engaging said ratchet disk in such manner as to permit turning movement of the trunnions in one direction only and to hold said trunnions in the position to which they are adjusted.

JOHN FOTAKIS.